United States Patent [19]

Eisenmann et al.

[11] 4,105,595

[45] Aug. 8, 1978

[54] PROCESS FOR THE PRODUCTION OF HIGHLY ELASTIC POLYURETHANE FOAMS

[75] Inventors: Karl Heinz Eisenmann, Bergisch-Neukirchen; Karl Heinz Broch, Leichlingen, both of Germany

[73] Assignee: Bayer Aktiengesellschaft, Leverkusen, Germany

[21] Appl. No.: 803,717

[22] Filed: Jun. 6, 1977

Related U.S. Application Data

[63] Continuation of Ser. No. 610,196, Sep. 4, 1975, abandoned.

[30] Foreign Application Priority Data

Sep. 17, 1974 [DE] Fed. Rep. of Germany ....... 2444331

[51] Int. Cl.² ............................................. C08G 18/14
[52] U.S. Cl. .................................... 521/159; 521/904; 521/917; 521/124; 521/174; 521/167
[58] Field of Search .................. 260/2.5 BD, 2.5 AT, 260/2.5 AP, 2.5 BC

[56] References Cited

U.S. PATENT DOCUMENTS

| | | | |
|---|---|---|---|
| 2,779,689 | 6/1975 | Reis, Jr. ........................... | 260/2.5 BC |
| 3,741,917 | 6/1975 | Morehouse .................... | 260/2.5 BD |
| 3,887,483 | 6/1975 | Morehouse .................... | 260/2.5 BD |

FOREIGN PATENT DOCUMENTS

| | | | |
|---|---|---|---|
| 234,245 | 1/1960 | Australia ............................. | 260/2.5 BC |
| 686,281 | 5/1964 | Canada .............................. | 260/2.5 BD |
| 1,333,088 | 10/1973 | United Kingdom .............. | 260/2.5 BD |

OTHER PUBLICATIONS

"Continuous Preparation of Urethane Foam Prepolymer", by Knox; Dupont Tech. Bul. HR-29, Jul., 1958.

Primary Examiner—Eugene C. Rzucidlo
Attorney, Agent, or Firm—Gene Harsh; Joseph C. Gil

[57] ABSTRACT

The instant invention relates to an improved process for the production of cold-hardening polyurethane foams through the reaction of modified polyisocyanates with compounds having at least two active hydrogen atoms in the presence of blowing agents. The improved process is characterized by the fact that the modified polyisocyanate is prepared in a preliminary stage immediately before foaming.

3 Claims, No Drawings

PROCESS FOR THE PRODUCTION OF HIGHLY ELASTIC POLYURETHANE FOAMS

This is a continuation, of application Ser. No. 610,196, filed Sep. 4, 1975, now abandoned.

BACKGROUND OF THE INVENTION

For some time now, foams having a variety of different physical properties have been commercially produced by the isocyanate polyaddition process from compounds containing two or more active hydrogen atoms and especially from compounds containing hydroxyl and/or carboxyl groups, and polyisocyanates, optionally in the presence of water, activators, emulsifiers, foam stabilizers and other additives (cf. R. Vieweg, A. Hochtlen, Kunststoff-Handbuch, Vol. VII Polyurethane, Carl-Hanser-Verlag, Munich 1966). By virtue of this process, it is possible by suitably selecting the components, to obtain foams ranging from rigid foams to elastic foams.

Soft-elastic polyurethane foams are widely used as upholstery materials in the manufacture of seat cushioning and back cushioning. These materials are expected to provide a high degree of comfort comparable with that of natural or latex foams. Physically, the quality of the upholstery may be represented by the so-called "sag" factor (i.e., the quotient of the hardness value at 65% and 25% compression, the overall deformation being kept constant for one minute in either case) and the trend of the force-deformation curves. To obtain good upholstery properties, the sag factor should have a value above 2.5, while the force-deformation curves should not have any plateau. In other words, minimal changes in force should be accompanied by only a minimal change in deformation. Although attempts have been made to improve the sag factor of foams by adding inert fillers, such as barium sulphate or calcium carbonate, the products so produced are attended by serious disadvantages since the fillers are extremely difficult to add and adversely affect the other properties of the foam.

According to German Auslegeschrift Nos. 1,929,034 and 2,002,064, soft-elastic polyurethane foams are obtained by reacting isocyanurate or allophanate polyisocyanates, so-called "modified polyisocyanates", with polyethers containing hydroxyl groups in the presence of amines as catalysts. This necessarily means that the polyisocyanate component has to be modified before the actual foaming process.

According to German Offenlegungsschrift No. 2,003,431, polyurethane foams are obtained by reacting undistilled phosgenation products of primary amines having amine numbers of 87 to 168 with a polyether containing hydroxyl groups in the presence of a non-polymeric polyol as crosslinker, a blowing agent and a catalyst, but in the absence of a silicone stabilizer of the polyoxyalkylene ether-polydimethyl siloxane block copolymer type. This process also has serious disadvantages because the polyisocyanate used as starting material is virtually a crude product which contains different quantities of polyisocyanates differing in their functionality and which does not have any standardized properties. So far as the production of foams is concerned, this means that changes in recipe have to be constantly made, in extreme cases in the amounts of isocyanate used in order to correct for the fluctuations in the activity of the isocyanate.

As already mentioned, "modified isocyanates" are often used for the production of soft-elastic foams. However, the foam manufacturer has to install additional storage tanks for these products and other machinery, inter alia, for their handling and dosage. In the case of a standard commercial-grade "modified isocyanate", the processor cannot himself select or determine the degree of crosslinking of this product. It has now been found that these disadvantages can be obviated by preparing the "modified isocyanate" in a preliminary stage immediately before foaming.

DESCRIPTION OF THE INVENTION

The instant invention relates to a process for the production of cold-hardening polyurethane foams by the reaction, known per se, of modified polyisocyanates with compounds having at least two reactive hydrogen atoms and molecular weights in the range from 400 to 10,000 in the presence of water and/or organic blowing agents, and optionally, catalysts, foam stabilizers and other additives, distinguished by the fact that the modified polyisocyanate is prepared in a preliminary state immediately before foaming. To achieve this, the mixing head used for foaming, for example, is preceded by another mixing head for mixing the starting product(s) and the catalyst or catalyst mixture and by a reaction zone for carrying out the reaction.

The expression "immediately before foaming" is intended to mean that the modified isocyanate is continuously delivered to the mixing head used for foaming immediately after its production, i.e. without storage. However, in cases where foaming is carried out intermittently, for example, in the manufacture of moldings, provision must be made for brief intermediate storage for the purposes of equilization between continuous production of the modified isocyanate and its intermediate foaming. The residence time or reaction time should be kept as short as possible, which can be achieved for example by suitably selecting the reactants and/or by using particularly active catalysts or catalyst mixtures, by increasing the quantity in which the catalysts or catalyst mixtures are added and, not least, by utilizing increased reaction temperatures. If necessary, the reaction zone may be followed by a tempering zone for bringing the modified product to the optimum foaming temperature. In general, the period of time elapsing between preparation of the modified polyisocyanate in the first mixing unit and foaming in a second mixing unit is between 0.1 second and 20 minutes and is preferably between 1 second and 10 minutes.

In the context of the invention, modified polyisocyanates are polyisocyanates containing carbodiimide, biuret, allophanate, urethane or isocyanurate groups. The production of these modified polyisocyanates is known per se. Thus, polyisocyanates containing allophanate groups may be produced, for example, in accordance with Belgian Pat. No. 763,529, while polyisocyanates containing biuret groups may be produced, for example, in accordance with British Pat. No. 889,050 or in accordance with German Pat. No. 1,101,394. Polyisocyanates containing isocyanurate groups and processes for their production are described, for example, in German Pat. Nos. 951,168 and 1,022,789, in British Pat. Nos. 821,158; 827,120; 856,372; 927,173; 920,080 and 952,931; in U.S. Pat. Nos. 3,154,522 and 2,801,244 in French Pat. No. 1,510,342 and in Belgian Pat. No. 718,994. The production of polyisocyanates containing urethane groups is also known per se and may be carried out, for example, by reacting polyols with an excess of polyisocyanates. Suitable polyols include polyols having a molecular weight in the range from 62 to 5000 such as, ethylene glycol, diethylene glycol, polyethylene glycol, 1,3-propane diol, 1,4-butane diol, 1,6-hexane diol, glycerol, trimethylol propane and alkylene oxide derivatives of these low molecular weight polyols, mentioned by way of example, which lead to relatively high molecular weight polyethers. Polyesters having hydroxyl groups and molecular weights in the aforementioned range may also be used in accordance with the invention.

Starting isocyanates suitable for use in the production of the modified polyisocyanates include, aliphatic, cycloaliphatic, araliphatic, aromatic and heterocyclic polyisocyanates of the type generally known and described, for example, by W. Siefken in Justus Liebigs Annalen der Chemie, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane (German Auslegeschrift No. 1,202,785) 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate; naphthylene-1,5-diisocyanate; triphenyl methane-4,4',4''-triisocyanate; polyphenyl polymethylene polyisocyanates, of the type obtained by condensing aniline with formaldehyde, followed by phosgenation, and described, for example, in British Pat. Nos. 874,430 and 848,671; and perchlorinated aryl polyisocyanates of the type described, for example, in German Auslegeschrift No. 1,157,601.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

Metal catalysts, such as bismuth or tin compounds, are generally used in the production of the modified polyisocyanates. Amines may be used instead of the metal compounds or as co-catalysts with the metal compounds. Amines and compounds of the Mannich base type are very suitable for catalyzing the trimerization reaction by which this type of modified polyisocyanate is produced. The production of the modified polyisocyanates used in accordance with the invention is described by way of example in the following: a crosslinking mixture, consisting of one or more catalysts which accelerate the crosslinking reaction and of one or more short-chain, low molecular weight organic compounds containing several hydroxyl groups and/or even amino groups (>NH, —NH$_2$), is introduced by means of a high pressure pump such as an inline or axial or radial piston pump into a HK mixing head (sold by Maschinenfabrik Hennecke GmbH, Birlinghoven, Siegkreis, Germany) into which tolylene diisocyanate is simultaneously introduced under pressure through a second high pressure pump. After intensive mixing, the reaction mixture flows for 20 to 60 seconds through a tempered tubular coil and then into a stirrer-equipped mixing head where the now modified isocyanate is combined by mixing with the other components, for example, those of the recipe quoted in Example 1, and the resulting mixture foamed in the usual way upon leaving the mixing head.

The modified isocyanate obtained by trimerization is similarly produced. In this case, modification is carried out, for example, with TDI and catalyst.

Other starting components suitable for use in accordance with the invention for foam production are compounds having at least two isocyanate-reactive hydrogen atoms and molecular weights generally in the range from 400 to 10,000. Such compounds include those containing amino groups, thiol groups, hydroxy groups, or carboxyl groups. The preferred compounds of this kind are the polyhydroxyl compounds, especially compounds containing from 2 to 8 hydroxyl groups with molecular weights of from 800 to 10,000 and preferably from 1000 to 6000. Specific examples include, polyesters, polyethers, polythioethers, polyacetals, polycarbonates and polyester amides, containing at least 2, generally 2 to 8 but preferably 2 to 4 hydroxyl groups, of the type known in the art for the production of homogeneous and cellular polyurethanes.

The polyesters containing hydroxyl groups suitable for use in accordance with the invention include reaction products of polyhydric, preferably dihydric and optionally, also trihydric alcohols with polyvalent, preferably divalent, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated. Examples of polycarboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid; optionally in admixture with monomeric fatty acids; terephthalic acid dimethyl ester and terephthalic acid-bis-glycol ester. Examples of polyhydric alcohols include ethylene glycol; 1,2- and 1,3-propylene glycol; 1,4- and 2,3-butylene glycol; 1,6-hexane diol; 1,8-octane diol; neopentyl glycol; cyclohexane dimethanol (1,4-bis-hydroxymethyl cyclohexane); 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain terminal carboxyl groups. Polyesters of lactones (such as ε-caprolactone) or hydroxy carboxylic acids (such as ω-hydroxycaproic acid) may also be used.

The polyethers preferably used in accordance with the invention contain at least two, generally two to eight but preferably two to three hydroxyl groups, are also known per se and are generally obtained by homopolymerizing epoxides such as ethylene oxide, propylene oxide, butylene oxide, tetrahydrofuran, styrene oxide or epichlorohydrin for example in the presence of BF$_3$, or by adding these epoxides, optionally in admixture or in succession, with starter components containing reactive hydrogen atoms. Starter components include water, alcohols, and amines. Specific examples include ethylene glycol, 1,3- or 1,2-propylene glycol, trimethylol propane, 4,4'-dihydroxy diphenyl propane, aniline, ammonia, ethanolamine and ethylene diamine. Sucrose polyethers, of the type described for example in German Auslegeschrift Nos. 1,176,358 and 1,064,938 may also be used in accordance with the invention. In many cases, it is preferred to use polyethers containing predominant amounts of primary OH-groups (up to 90% by weight, based on all the OH-groups present in the polyether). Polyethers modified by vinyl polymers, of the type formed for example by polymerizing styrene, and acrylonitrile in the presence of polyethers (U.S. Pat. Nos. 3,383,351; 3,304,273; 3,523,093 and 3,110,695; German Pat. No. 1,152,536) are also suitable, as are polybutadienes containing OH-groups.

According to the invention, it is also possible to use low molecular weight crosslinkers having active hydrogen atoms (molecular weight 32–400) such as those of the type mentioned above. Crosslinkers of this kind also include hydrazine and its derivatives as well as alkanolamines.

Among the polythioethers, reference is made in particular to the condensation products of thiodiglycol on its own and/or with other glycols, dicarboxylic acids, formaldehyde, aminocarboxylic acids or aminoalcohols. Depending upon the co-components, the products in question are polythio mixed ethers, polythioether esters or polythioether ester amides.

Polyacetals include the compounds which may be obtained from glycols, such as diethylene glycol, triethylene glycol, 4,4'-dioxethoxy diphenyl dimethyl methane, hexane diol and formaldehyde. Polyacetals suitable for use in accordance with the invention can also be obtained by polymerizing cyclic acetals.

Suitable polycarbonates containing hydroxyl groups are known and include those which can be obtained, for example, by reacting diols such as 1,3-propane diol, 1,4-butane diol and/or 1,6-hexane diol, diethylene glycol, triethylene glycol, tetraethylene glycol, with diaryl carbonates (such as diphenyl carbonate) or phosgene.

The polyester amides and polyamides include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the invention.

Examples of the many compounds suitable for use in accordance with the invention are known and are described, for example, in High Polymers, Vol. XVI "Polyurethanes, Chemistry and Technology", by Saunders-Frisch, Interscience Publishers, New York, London, Vol. I, 1962, pages 32 to 42 and pages 44 to 54, and Vol. II, 1964, pages 5 to 6 and 198 to 199, and in Kunststoff-Handbuch, Vol. VII, Vieweg-Hochtlen, Carl-Hanser-Verlag, Munich 1966, pages 45 to 71.

According to the invention, water and/or readily volatile organic substances are used as blowing agents. Examples of organic blowing agents include acetone, ethyl acetate; halogen-substituted alkanes such as methylene chloride, chloroform, ethylidene chloride, vinylidene chloride, monofluorotrichloromethane, chlorodifluoromethane and dichlorodifluoromethane; butane; hexane; heptane; and diethyl ether. A blowing effect can also be obtained by adding compounds which decompose at temperatures above room temperature giving off gases such as nitrogen. Such compounds include azo compounds such as azoisobutyronitrile. Other examples of blowing agents and particulars on the use of blowing agents may be found in Kunststoff-Handbuch, Vol. VII, Vieweg and Hochtlen, Carl-Hanser-Verlag, Munich 1966, pages 108 and 109, 453–455 and 507–510.

In addition, catalysts may often be used for foam production in accordance with the invention. Catalysts suitable for this purpose include catalysts known per se including tertiary amines such as triethyl amine, tributyl amine, N-methyl morpholine, N-ethyl morpholine, N-cocomorpholine, N,N,N',N'-tetramethyl ethylene diamine, 1,4-diazabicyclo-(2,2,2)octane, N-methyl-N'-dimethyl aminoethyl piperazine, N,N-dimethyl benzyl amine, bis-(N,N-diethyl aminoethyl)-adipate, N,N-diethyl benzyl amine, pentamethyl diethylene triamine, N,N-dimethyl cyclohexyl amine, N,N,N',N'-tetramethyl-1,3-butane diamine, N,N-dimethyl-$\beta$-phenyl ethyl amine, 1,2-dimethyl imidazole and 2-methyl imidazole. Other suitable catalysts include Mannich bases of secondary amines such as dimethyl amine, and formaldehyde, ketones or phenols, such as acetone, methyl ethyl ketone, cyclohexanone, phenol, nonyl phenol and bisphenol.

Tertiary amines containing isocyanate-reactive hydrogen atoms may be used and include triethanolamine, triisopropanolamine, N-methyl diethanolamine, N-ethyl diethanolamine and N,N-dimethyl ethanolamine and their reaction products with alkylene oxides such as propylene oxide and/or ethylene oxide.

Other suitable catalysts include silaamines with carbon-silicon bonds, of the type described for example in German Pat. No. 1,229,290. Examples include 2,2,4-trimethyl-2-silamorpholine and 1,3-diethyl aminomethyl tetramethyl disiloxane.

Other suitable catalysts include nitrogen-containing bases such as tetraalkyl ammonium hydroxides; alkali hydroxides such as sodium hydroxide; alkali phenolates such as sodium phenolate; or alkali alcoholates such as sodium methylate. Hexahydrotrizines may also be used as catalysts.

According to the invention, organometallic compounds especially organo tin compounds, may also be used as catalysts.

Preferred organo tin compounds are tin(II) salts of carboxylic acids such as tin(II) acetate, tin(II) octoate, tin(II) ethyl hexoate and tin(II) laurate, and the tin(IV) compounds, for example, dibutyl tin oxide, dibutyl tin dichloride, dibutyl tin diacetate, dibutyl tin dilaurate, dibutyl tin maleate or dioctyl tin diacetate. It is of course also possible to use mixtures of any of the aforementioned catalysts.

Other catalysts suitable for use in accordance with the invention and information on the way in which the catalysts work may be found in Kunststoff-Handbuch, Vol. VII, Vieweg and Hochtlen, Carl-Hanser-Verlag, Munich 1966, pages 96 to 102.

The catalysts are generally used in a quantity of from about 0.001 to 10% by weight, based on the quantity of compounds having at least two isocyanate-reactive hydrogen atoms and a molecular weight in the range from 400 to 10,000.

Surface-active additives (emulsifiers and foam stabilizers) may also be used in accordance with the invention. Suitable emulsifiers include the sodium salts of castor oil sulphonates or fatty acids; or salts of fatty acids with amines, such as diethyl amine oleate or diethanolamine stearate. Alkali or ammonium salts of sulphonic acids such as dodecyl benzene sulphonic acid or dinaphthyl methane disulphonic acid or of fatty acids, such as ricinoleic acid, or of polymeric fatty acids, may also be employed as surfaceactive additives.

If foam stabilizers are used, the polyether siloxanes are preferred especially water-soluble polyether siloxanes. These compounds are generally in the form of a copolymer of ethylene oxide and propylene oxide attached to a polydimethyl siloxane radical.

According to the invention, it is also possible to use reaction retarders including acid-reacting substances, such s hydrochloric acid or organic acid halides; cell regulators such as paraffins, fatty alcohols, or dimethyl polysiloxanes; pigments or dyes; flameproofing agents such as tris-chloroethyl phosphate, tricresyl phosphate or ammonium phosphate and polyphosphate; stabilizers against the effects of ageing and weathering; plasticizers; fungistatic and bacteriostatic agents and fillers such as barium sulphate, kieselguhr carbon black or prepared chalk.

Other examples of the surface-active additives, foam stabilizers, cell regulators, reaction retarders, stabilizers, flameproofing agents, plasticizers, dyes, fillers, fungistatic and bacteriostatic agents, optionally used in accordance with the invention, and information on the use of these additives and the way in which they work may be found in Kunststoff-Handbuch, Vol. VII, Vieweg und Hochtlen, Carl-Hanser-Verlag, Munich 1966, pages 103 to 113.

According to the invention, the reaction components may be reacted by the known one-stage process, by the prepolymer process or by the semi-prepolymer process, in many cases using machines, for example, of the type described in U.S. Pat. No. 2,764,565. Information on processing machines which may also be used in accordance with the invention may be found in Kunststoff-Handbuch, Vol. VII, Vieweg-Hochtlen, Carl-Hanser-Verlag, Munich 1966, for example on pages 121 to 205.

The foams produced by the process according to the invention when in the form of blocks or shaped articles are used for example, as upholstery materials, mattresses, packaging materials, shock-absorbing automobile components, sheeting for laminating purposes and as insulating materials.

In cases where foaming is carried out in molds, the reaction mixture is introduced into a mold. The molds may be made of metals such as, aluminum, or of plastics such as, epoxide resin. The foamable reaction mixture foams in the mold and forms the shaped article.

In-mold foaming may be carried out in such a way that the shaped article has a cellular structure at its surface, although it may also be carried out in such a way that the shaped article has a compact skin and a cellular core. According to the invention, it is possible in this connection to proceed by introducing such a quantity of foamable reaction mixture into the mold that the foam formed just fills the mold. However, it is also possible to introduce more foamable reaction mixture into the mold than is required for filling the mold cavity with foam. This particular technique is known as "overcharging" and is described in U.S. Pat. Nos. 3,178,490 and 3,182,104.

Mold-release agents known per se are frequently used for in-mold foaming and may be used in practicing the instant invention.

Cold-hardening foams in particular are produced in accordance with the invention (cf. British Pat. No. 1,162,517 and German Offenlegungsschrift No. 2,153,086). The process according to the invention is illustrated by the following examples.

EXAMPLE 1

100 parts by weight of a polyether having an OH-number of 470 (obtained by reacting propylene oxide with ethylene diamine), 0.5 part by weight of bismuth octoate as catalyst and 750 parts by weight of tolylene diisocyanate (ratio of 2,4- to 2,6-isomer 80:20% by weight) are mixed together in a mixing unit and reacted in a subsequent reaction zone, kept at 22° C, with a residence time of 25 seconds. Immediately afterwards, the reaction mixture is mixed with the following components and foamed in known manner in the mixing head of a conventional foaming machine: 100 parts by weight of a polyether having an OH-number of 28 (obtained by reacting trimethylol propane with propylene oxide and then with ethylene oxide) 3.5 parts by weight of water, 0.2 part by weight of triethylene diamine as catalyst, 0.3 part by weight of a standard commercial-grade foam stabilizer (stabilizer B 3207, a product of Th. Goldschmidt AG, Essen) 2.0 parts by weight of trichloroethyl phosphate and 4.0 parts by weight of diethanolamine. 64.4 parts by weight of the modified polyisocyanate (NCO-content 35% by weight) are used for foaming with these components. The index amounts to 95.

$$\text{(index} = \frac{\text{amount of isocyanate (actual)} \cdot 100}{\text{amount of isocyanate (theoretical)}})$$

A highly elastic polyurethane foam is obtained which has a density of 28 kg/m$^3$ and a SAG of 2.8 and whose force-deformation curves show hardly any plateau and which therefore have outstanding upholstery properties. The foam has a compression hardness of 2.40 KPa under 40% deformation.

EXAMPLE 2

The procedure is as in Example 1, except that 1200 parts by weight instead of 750 parts by weight of tolylene diisocyanate are used and the 4.0 parts by weight of diethanolamine are replaced by 3.0 parts by weight. The modified polyisocyanate having an NCO-content of 41.4% is added in a quantity of 50.1 parts by weight (index 97).

The foam obtained is highly elastic, has a density of 26 kg/m$^3$ for a compression hardness of 0.88 KPa under 40% deformation and a SAG factor of 3.1.

EXAMPLE 3

The procedure is as in Example 1, except that only 35.2 parts by weight of the modified isocyanate having an NCO-content of 35% are used, and in addition, 21.2 parts by weight of tolylene diisocyanate (80:20) added so that this mixture has a calculated NCO-content of 40% by weight. The foam obtained is highly elastic, has a density of 26 kg/m$^3$ for a compression hardness of 1.10 KPa under 40% deformation and a SAG factor of 2.9.

EXAMPLE 4

100 parts by weight of a polyether having an OH-number of 850 (obtained by reacting propylene oxide with trimethylol propane) 15 parts by weight of ethylene glycol, 1.0 part by weight of bismuth octoate as catalyst and 2400 parts by weight of tolylene diisocyanate (80:20) are mixed with one another in a mixing unit and reacted in a subsequent reaction zone kept at 50° C with a residence time of 25 seconds. The reaction mixture is then mixed with the following components and foamed in known manner in the mixing head of a conventional foaming machine: 100 parts by weight of a polyether having an OH-number of 28 (obtained by reacting trimethylol propane with propylene oxide and then with ethylene oxide) 3.5 parts by weight of water, 0.15 part by weight of triethylene diamine, 4.0 parts by weight of diisopropanolamine, 2.0 parts by weight of trichloroethyl phosphate and 1.0 part by weight of triethanolamine. 54.4 parts by weight (index 97) of the modified polyisocyanate (NCO-content 41.8% by weight) are used for foaming with these components.

A highly elastic polyurethane foam is obtained which has a density of 29 kg/m$^3$ and a compression hardness of 1.47 KPa under 40% deformation. The force-deformation curves show almost no plateau.

EXAMPLE 5

100 parts by weight of a polyether having an OH-number of 915 (obtained by reacting propylene oxide with trimethylol propane) 6.7 parts by weight of a 33% solution of triethylene diamine in dipropylene glycol as catalyst and 1450 parts by weight of tolylene diisocyanate (80:20) are mixed with one another in a mixing unit and reacted in a subsequent reaction zone, kept at 25° C with a residence time of 90 seconds. The reaction mixture is then mixed with the following components and foamed in known manner in the mixing head of a conventional foaming machine: 100 parts by weight of a polyether having an OH-number of 28 (obtained by reacting trimethylol propane with propylene oxide and then with ethylene oxide) 3.5 parts by weight of water, 0.2 part by weight of triethylene diamine, 0.2 part by weight of a standard commercial-grade foam stabilizer (stabilizer B 3207, a product of Th. Goldschmidt AG, Essen) 2.0 parts by weight of trichloroethyl phosphate and 3.0 parts by weight of diethanolamine.

52.9 parts by weight (index 95) of the modified polyisocyanate (NCO-content 40.4% by weight) are used for foaming with these components.

The highly elastic foam obtained has a density of 31 kg/m$^3$ and a compression hardness of 1.67 KPa under 40% deformation.

EXAMPLE 6

100 parts by weight of the polyether of Example 5 (OH-number 915) 1.1 parts by weight of tin dioctoate, 3.3 parts by weight of a 33% solution of triethylene diamine in dipropylene glycol and 1430 parts of tolylene diisocyanate (80:20) are mixed with one another in a mixing unit and reacted in a subsequent reaction zone kept at 40° C with a residence time of 70 seconds. The reaction mixture is then mixed with the components mentioned in Example 5 and foamed in known manner in the mixing head of a conventional foaming machine, 59.2 parts by weight of the modified polyisocyanate (NCO-content 36.2% by weight) being added. The index is 95.

The highly elastic foam has a density of 34 kg/m$^3$ and a compression harness of 3.43 KPa under 40% deformation.

EXAMPLE 7

95 parts by weight of the polyether of Example 5 (OH-number 915) 5.0 parts by weight of ethylene glycol, 2.0 parts by weight of tin dioctoate and 1460 parts by weight of tolylene diisocyanate (80:20) are mixed with one another in a mixing unit and reacted in a subsequent reaction zone kept at 25° C with a residence time of 23 seconds. The reaction mixture is then mixed with the components mentioned in Example 5 and foamed in known manner in the mixing head of a conventional foaming machine, 52.9 parts by weight of the modified polyisocyanate (NCO-content 40.3% by weight) being added. The index is 95.

The highly elastic foam has a density of 34 kg/m$^3$ and a compression hardness of 2.06 KPa under 40% deformation.

EXAMPLE 8

1500 parts by weight of tolylene diisocyanate (80:20), 1.0 part by weight of bismuth octoate, 2.0 parts by weight of a Mannich base of Dimethyl amine, phenol and formaldehyde as catalyst, are mixed with one another in a mixing unit and reacted in a subsequent reaction zone kept at 100° C with a residence time of 8 minutes. The reaction mixture is then cooled for 2 minutes in a cooling zone kept at 20° C and subsequently mixed with the components mentioned in Example 5 and foamed in known manner in the mixing head of a conventional foaming machine, 57.0 parts by weight of the modified polyisocyanate (NCO-content 37.6% by weight) being added. The index is 95.

The highly elastic foam has a density of 44 kg/m$^3$ for a compression hardness of 4.91 KPa under 40% deformation.

EXAMPLE 9

To prepare the modified isocyanate, the procedure is as in Example 8, except that the residence time in the reaction zone heated to 100° C is 3 minutes and the residence time in the cooling zone kept at 20° C is 2 minutes. The modified polyisocyanate thus obtained, NCO-content 45.4% by weight, is foamed with the components mentioned in Example 5. According to the index of 95, 47.0 parts by weight of the isocyanate are used.

The highly elastic foam has a density of 34 kg/m$^3$ for a compression hardness of 1.18 KPa under 40% deformation.

What is claimed is:

1. In the process for the production of cold hardening polyurethane foams by the reaction of modified polyisocyanates with polyethers containing predominant amounts of primary OH groups and molecular weights in the range from 400 to 10,000 in the presence of water and/or organic blowing agents and optionally catalysts, foam stabilizers, cross-linking agents with active hydrogen atoms and molecular weights in the range from 30 to 400, and other additives, the improvement wherein the mixing head used for the mixing of the foam reactants is preceded by another mixing head for mixing the starting components for said modified polyisocyanates and the catalyst or catalyst mixtures which are necessary for the production of such modified polyisocyanates, and by a reaction zone for carrying out the production of the modified polyisocyanates within a time of from 0.1 seconds to 20 minutes befor forming.

2. The process of claim 1 wherein up to 90% by weight of the hydroxyl groups in the polyethers are primary hydroxyl groups.

3. The process of claim 1 wherein said modified polyisocyanate is prepared from between 1 second and 10 minutes before foaming.

* * * * *